United States Patent [19]
Couttet et al.

[11] 3,928,399
[45] Dec. 23, 1975

[54] NEMATIC LIQUID CRYSTAL 4-METHOXY-4'-HYDROXYTOLAN ESTERS

[75] Inventors: André Couttet; Jean Claude Dubois; Annie Zann, all of Paris, France

[73] Assignee: Thomson-CSF, Paris, France

[22] Filed: Jan. 8, 1974

[21] Appl. No.: 431,719

[30] Foreign Application Priority Data
Jan. 12, 1973  France .................. 73.1083

[52] U.S. Cl. .......... 260/410.5; 260/463; 260/479 R
[51] Int. Cl.² .................. C07C 69/96; C07C 69/28; G01N 33/00; G02F 1/13
[58] Field of Search .............. 260/463, 479 R, 410.5

[56] References Cited
UNITED STATES PATENTS
3,772,209  11/1973  Batesky ..................... 252/408

OTHER PUBLICATIONS
Brown et al., Chemical Reviews, Vol. 57, pp. 1049–1157 (1957), pp. 1075–1077.
Brown, Analytical Chemistry, Vol. 41, No. 13, pp. 26a–28, (Nov. 1969).
Malthete, et al., Chemical Abstracts, Vol. 75, 133,979w (1971).
Veschambre et al., Chemical Abstracts, Vol. 68, 38,939e (1968).

Primary Examiner—Paul M. Coughlan, Jr.
Assistant Examiner—Diana G. Rivers
Attorney, Agent, or Firm—Cushman, Darby & Cushman

[57] ABSTRACT

Nematic liquid crystals having long-term stability even in presence of light radiation and electric fields are provided for display devices.

The crystals are derivatives of tolan having the general formula:

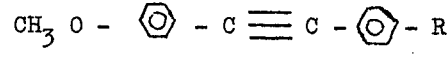

in which R is an organic radical being of ester type ($C_n H_{2n+1} C O — O$) or of carbonate type ($C_n H_{2n+1} O — C O — O$), $n$ being a whole number from 1 to 10.

12 Claims, No Drawings

NEMATIC LIQUID CRYSTAL 4-METHOXY-4'-HYDROXYTOLAN ESTERS

The present invention relates to nematic liquid crystals.

The known substances which, at a given temperature exhibit a nematic structure, have a limited stability. Certain ones of these decompose under the effect of an electric field, beyond a certain field strength. The majority are sensitive to light, in fact increasingly so the more they exhibit colouration due to the fact that they absorb part of the spectrum whose energy, by photochemical effect, produces degradations in the nematic substance. All these substances have a limited life time.

The invention overcomes these drawbacks by providing colourless, highly stable nematic liquid crystals.

The liquid crystals in accordance with the invention satisfy the general formula of the following derivatives of tolan:

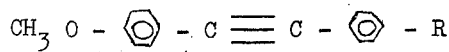

wherein the radical R belongs to the following group:

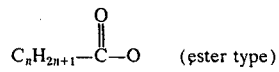 (ester type)

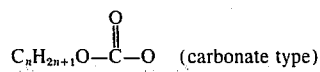 (carbonate type)

$n$ being a whole number from 1 to 10.

These crystals are prepared in the following manner, starting from a hydroxytolan having the formula:

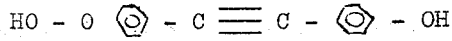

or the formula:

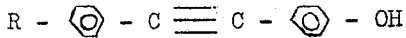

The preparation of hydroxytolan and its derivatives is well known in literature (for instance methods described by SMITH in its book Organic Synthesis, Vol. 22, ed. 1942).

For instance, etherification (or esterification) reactions are carried out in two steps, as follows:

First step

Reaction of 4-4'-dihydroxytolan with a methylhalide, for example methyliodide

I CH$_3$ followed by the extraction of 4-methoxy-4'hydroxytolan.

Second step

The product of the first reaction is placed in the presence under predetermined conditions (see the example hereinafter), of:
- either an acylhalide (case of ester type radical),
- or a carbonate of halide (case of carbonate type radical).

EXAMPLE

Where 

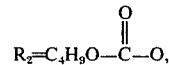

the second step is carried out as follows:

The starting products are the "4-methoxy-4'-hydroxytolane" from the first step (in a quantity of 0.8 g) and 0.82g of butyl chlorocarbonate in solution in pyridine (10 ml.). The reactants are left in contact for 48 hours, after which the reaction mixture is poured onto a mixture of ice and dilute sulphuric acid. The product is then extracted with ether and washed with water until neutral.

Following evaporation of the ether, 1.1 g of crude product are obtained. After the crude product has been dissolved in benzene, it is filtered over silica, for example by passage through a chromatographic column, followed by two successive crystallisations in hexane. 0.8 g of "4-methoxy-4'-butyl carbonate tolane" are obtained.

Those skilled in the art will appreciate that the organic substances forming the liquid crystals have a melting point at a temperature $T_F$ and a clarification point at a temperature $T_I$. Between these two temperatures, the substance has an intermediate phase between the crystalline solid and the isotropic liquid which is known as the mesomorphic phase or "mesophase".

In this intermediate phase, the axes of the elongated molecules, under the effect of an electrical field, are parallel to a given direction which can be varied by means of the electrical field.

If the relative dielectric constant is measured first in the direction of the axis of the molecules of the liquid crystal oriented by an electrical field and then in a direction perpendicular to this axes, two values $\epsilon_1$ and $\epsilon_2$ are obtained and the difference between them calculated:

$$\Delta\epsilon = \epsilon_1 - \epsilon_2$$

Depending on whether this difference is positive or negative, the liquid crystal is said to have a positive or negative anisotropy. In addition, its absolute value is governed by temperature.

Tables 1 and 2 below show the characteristics of liquid crystals according to the invention. It can be seen from the examples that the "ester"-type compounds (Table 1) have a negative anisotropy whilst the "carbonate"-type compounds (Table 2) have hardly any anisotropy or a positive anisotropy.

Table 1:

"Ester"-type compounds : R$_2$ : —O C—r$_2$ (with C=O)

| Example No | r$_2$ | T$_F$(°C) | T$_I$(°C) | T$_I$-T$_F$ | Δε (maximum) |
|---|---|---|---|---|---|
| 1 | C$_3$H$_7$ | 84 | 110 | 26 | −0.35 |
| 2 | C$_4$H$_9$ | 84 | 98 | 14 | −0.35 |
| 3 | C$_5$H$_{10}$ | 94 | 104 | 10 | −0.31 |
| 4 | C$_6$H$_{13}$ | 80 | 94 | 14 | −0.33 |
| 5 | C$_7$H$_{15}$ | 85 | 95 | 10 | −0.28 |
| 6 | C$_8$H$_{17}$ | 85 | 90 | 5 | −0.18 |
| 7 | C$_9$H$_{19}$ | 89 | 91 | 2 | −0.08 |

Table 2:

"Carbonate"-type compounds: $R_2: -O-\overset{\overset{O}{\|}}{C}-O-r_2$

| Example No | $r_2$ | $T_F(°C)$ | $T_I(°C)$ | $T_I-T_F$ | $\Delta\epsilon$ (maximum) |
|---|---|---|---|---|---|
| 8 | $C_2H_5$ | 113 | Foot note[a] | Foot note[a] | — |
| 9 | $C_4H_9$ | 79 | 84 | 5 | +0.15 |

Foot note[a]:
When the liquid is supercooled, it becomes nematic from 104° C and finally isotropic from 82° C.

The liquid crystals according to the invention with a negative Δε of high absolute value show the phenomenon of dynamic diffusion with an excellent contrast.

A reduction and in some cases even an extension of the $T_I$-$T_F$ range, also known as the mesomorphism range, is obtained by mixing the preceding products with one another or with other liquid crystals.

EXAMPLES OF MIXTURES a. Mixture of the compounds of Examples 1 and 2 in Table 1 in molecular proportions of 45 to 55 : a mesomorphism range of 66° C to 103° C is obtained.

b. Binary mixture of the compound of Example 1 in Table 1 with a compound "4-methoxy-4'-amylphenyl benzoate" in molecular proportions of 20 to 80 : a mesomorphism range of 20° C to 50° C is obtained.

By virtue of the Addition, it is possible to obtain systems based on the dynamic diffusion of light (in the case of the "ester" type) and field-effect systems (in the case of the "carbonate" type).

What we claim is:

1. A nematic liquid crystal compound of the formula:

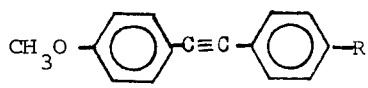

wherein R is

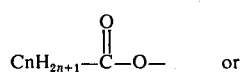 or

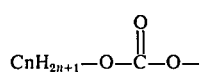

and $n$ is an integer from 1 to 10.

2. A nematic liquid crystal as claimed in claim 1 wherein R is

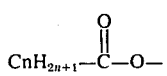

and $n$ has a value of 3–9.

3. A nematic liquid crystal as claimed in claim 1 wherein R is

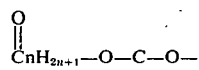

and $n$ has a value of 2 or 4.

4. A nematic liquid crystal compound as claimed in claim 1 wherein

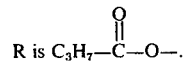

5. A nematic liquid crystal compound as claimed in claim 1 wherein

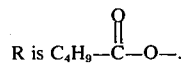

6. A nematic liquid crystal compound as claimed in claim 1 wherein

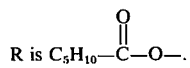

7. A nematic liquid crystal compound as claimed in claim 1 wherein

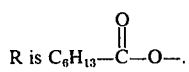

8. A nematic liquid crystal compound as claimed in claim 1 wherein

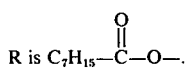

9. A nematic liquid crystal compound as claimed in claim 1 wherein

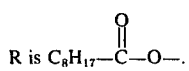

10. A nematic liquid crystal compound as claimed in claim 1 wherein

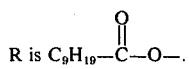

11. A nematic liquid crystal compound as claimed in claim 1 wherein

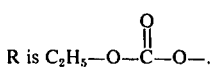

12. A nematic liquid crystal compound as claimed in claim 1 wherein

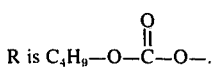

* * * * *